July 15, 1947.  T. M. BALL  2,424,137
CONTROL APPARATUS
Filed April 13, 1944
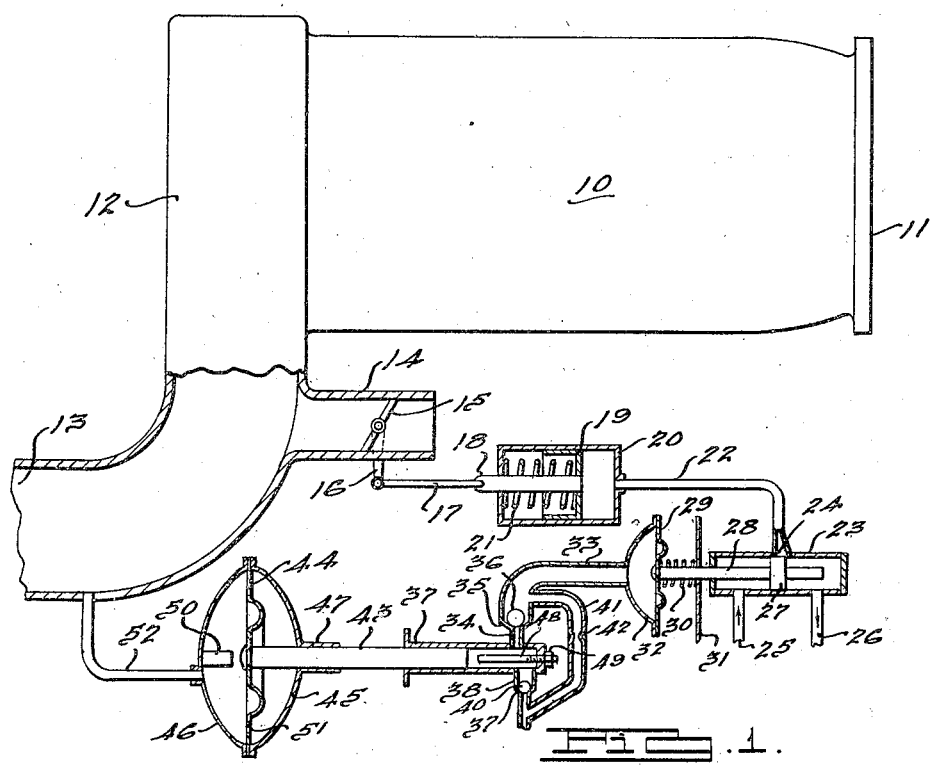
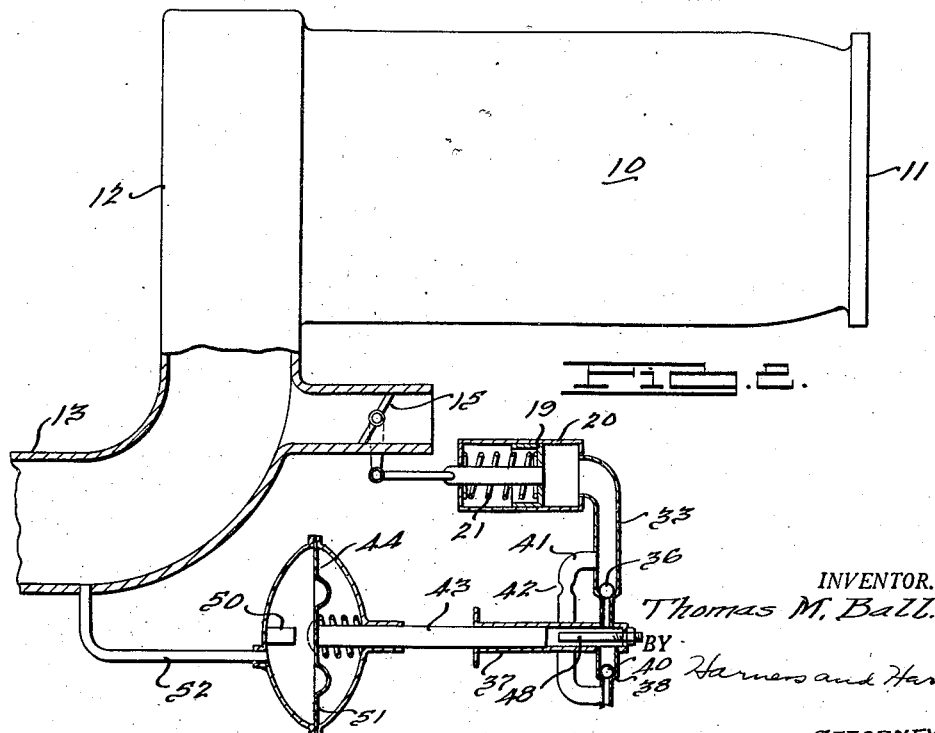
INVENTOR.
Thomas M. Ball.
BY Harness and Harris
ATTORNEYS.

Patented July 15, 1947

2,424,137

UNITED STATES PATENT OFFICE 2,424,137

CONTROL APPARATUS

Thomas M. Ball, Detroit, Mich., assignor to Chrysler Corporation, Highland Park, Mich., a corporation of Delaware Application April 13, 1944, Serial No. 530,925

8 Claims. (Cl. 230—115)

This application relates to an apparatus for controlling a supercharger. More specifically it relates to an apparatus for preventing a supercharger from reaching or exceeding the pumping limit.

It is known that superchargers, particularly those of the axial type, may under certain conditions reach a condition known as "pumping limit," at which the flow of gas through the machine is unsatisfactory. The velocity of the gas passing into the supercharger becomes too low for the rotational speed of the blades and associated parts. The gas meets the blades at too great an angle of attack, aerodynamic flow is interrupted, and the supercharger stalls. This condition produces noises and vibrations and pulsations that may cause physical failure of the parts.

If a supercharger is to be used only at one altitude, it is not difficult to design it so that it may be operated satisfactorily within the pumping limit. However, if the supercharger is to be used at different altitudes, as is the case when it is part of an aircraft power plant, the greatly varying intake pressures cause pumping limit to occur under varying conditions, and it is very difficult to make the supercharger operate within the pumping limit at all times.

An object of the present invention is to provide an improved control for a supercharger, particularly one of the axial type. More specifically the control is adapted to prevent the supercharger from reaching the pumping limit.

A further object is to produce a control for a supercharger for preventing the supercharger from reaching or exceeding the pumping limit, which control operates directly upon a phenomenon arising at a condition of pumping limit. The advantage in providing a control of this type is that it is more direct and is less dependent on a maze of complications such as operating characteristics of the supercharger at varying temperatures and pressures.

Other objects will appear from the disclosure.

In the drawings:

Fig. 1 is a view partially in section illustrating one form of the control apparatus of the present invention; and Fig. 2 is a similar view illustrating another form of the control apparatus.

The supercharger 10 has an inlet end 11 and an outlet end 12 from which extends a line 13 to an engine not shown. Connected to one point of the line 13 is an outlet 14 in which is mounted a spill gate 15. An arm 16 attached to the spill gate 15 is connected to a link 17 in turn connected to a piston stem 18 secured to a piston 19 mounted within a cylinder 20. A coil spring 21 acting between the left end of the cylinder 20 and the piston 19 urges the piston to the right, as viewed in Fig. 1. To the right end of the cylinder 20 is connected a line 22 leading from a cylinder 23. The line 22 has an enlarged opening 24 by which it is connected to the cylinder 23. A pressure line 25 for supplying fluid under pressure is connected to the cylinder 23. A drain line 26 is also connected to the cylinder 23. Slidably mounted within the cylinder 23 is a piston valve 27 to which is attached a rod 28 attached in turn to a diaphragm 29. A coil spring 30 acting between the diaphragm 29 and a stop 31 urges the diaphragm 29 to the left to the position shown in Fig. 1. The diaphragm 29 in this position acts through the rod 28 to maintain the valve 27 in the position shown in which it partially uncovers the opening 24 of the line 22 so that there may be flow between the line 22 and the drain line 26 but no flow between the pressure line 25 and the line 22. The diaphragm 29 is attached by its periphery to a shell member 32 attached to an end of a line 33. The line 33 has a reduced poriton 34 which is joined to the rest of the line 33 by a shoulder 35 forming a seat for a ball valve 36. The reduced portion 34 of the line 33 is connected at one side of a cylinder 37. To the other side of the cylinder is connected a line 38 having a reduced portion 39 forming a seat for a ball valve 40. A bypass 41 connecting the lines 33 and 38 has a restriction 42. Slidably mounted within the cylinder 37 is a piston rod 43 secured at its left end to a diaphragm 44 clamped by its periphery between casing members 45 and 46. The casing member 45 has a tubular portion 47 forming a journal for a portion of the piston rod 43. A rod 48 threaded into the right end of the cylinder 37 and held there by a jam nut 49 serves as a stop to rightward movement of the piston rod 43. A stop 50 secured within the casing part 46 serves to limit the leftward movement of the piston rod 43. An opening 51 is provided in the diaphragm 44. A line 52 extends from the casing member 46 to the line 13.

When during operation of the supercharger 10 the pumping limit is approached or reached, there are set up in the line 13 certain vibrations and pulsations, which are the result of fluctuation of pressure in line 13. These are transmitted through the line 52 to the diaphragm 44 causing it to move back and forth. As a result, the piston rod 43 connected to the diaphragm reciprocates within the cylinder 37 causing fluid to be drawn from the line 33 past the ball valve 40 and to be forced into the line 33 past the ball valve 36. The action is one of pumping and the piston rod and ball valves 36 and 40 may be regarded as pumping means. When the piston rod 43 moves to the left the ball valve 40 is raised from its seat 39 and fluid is drawn from the line 38 into the cylinder 37. During this time the ball valve 36 is held against its seat 35 by this same movement of the piston rod 43 to the left. When the piston rod 43 is moved to the right the ball valve 40 is held against the seat 39 and fluid does not go back down the line 38 whereas the ball valve 36 is raised from its seat 35 and fluid passes into the line 33 above the seat 35. This pumping action increases the amount of fluid and the pressure thereof between the seat 35 and the diaphragm 29 causing the latter to move to the right. The diaphragm in moving to the right acts through the rod 28 to move the piston valve 27 to the right uncovering the opening 24 of the line 22 to fluid under pressure from the pressure line 25 and closing the line 22 to the drain line 26. Thus fluid under pressure is forced into the line 22 and the cylinder 20 and acts against the piston 19 to move it to the left. Movement to the left of the piston acts through the piston stem 18, the link 17, and the arm 16 to move the spill gate 15 to an open position. Opening of the spill gate increases the flow of air through the supercharger and provides an upper limit to the relation of delivery and intake pressures of the supercharger and takes the supercharger away from the pumping limit or prevents it from exceeding the pumping limit. When this happens the vibrations previously referred to as being set up in the line 13 cease and movement to and fro of the diaphragm 44 also ceases. The piston rod 43 stops reciprocating, and no more fluid is pumped against the diaphragm 29. Fluid now drains through the bypass 41 past the restriction 42 to the line 38 and the diaphragm 29 moves under the action of the spring 30 back to the position shown in Fig. 1. In this position the piston valve 27 closes the line 22 to the pressure line 25 and opens it to the drain line 26. This brings about a reduction of pressure in the line 22 and the cylinder 20 causing the piston 19 to move to the right under the action of the spring 21 and the spill gate 15 is moved back to closed position.

In the modification of Fig. 2 the line 33 is directly connected to the cylinder 20 so that the fluid pumped by the piston rod 43 and the ball valves 36 and 40 moves the piston 19 in the cylinder 20 to the left opening the spill gate 15. However, the action of the device of Fig. 2 is in general the same as that of Fig. 1. The approach or arrival of the pumping limit sets up vibrations or pulsations in the line 13 that are transmitted through the line 52 to the diaphragm 44. The diaphragm 44 moves back and forth causing reciprocation of the piston rod 43 within the cylinder 37. The fluid is drawn from the line 38 past the ball valve 40 and forced into the line 33 past the ball valve 36. The fluid so pumped moves the piston 19 to the left opening the spill gate 15 bringing about an increase in the flow through the supercharger. This moves the supercharger away from the pumping limit or prevents it from exceeding the pumping limit and vibrations in the line 13 cease. This causes the diaphragm 44 to stop moving back and forth and as a result the piston 43 stops reciprocating. Fluid in the cylinder 20 and in the line 33 now flows through the bypass 41 and the restriction 42 therein to the line 38. The spring 21 now moves the piston 19 to the right in the position of Fig. 2 and the spill gate 15 is brought back to closed position.

As in the case of the modification of Fig. 1, the device of Fig. 2 is provided with stop 50 and rod 48 for limiting the restriction of the piston rod 43. These prevent any force or pulsation that might cause one or a few reciprocations of the piston rod 43 of considerable length from being effective to pump enough fluid to open the spill gate 15. It is to be noted that just a few reciprocations of the piston rod 43 or a single one is insufficient to move the piston 19 and to open the spill gate 15 because the bypass 41 will prevent the accumulation of fluid in the line 33 unless the reciprocations of the piston rod 43 are carried out continuously and for a considerable length of time.

It will be apparent from the foregoing description that two novel control apparatuses have been provided by which a supercharger is kept away from the pumping limit or is prevented from exceeding the pumping limit. These apparatuses function through a pumping action produced by vibrations or pulsations incident to approach or arrival of the pumping limit. In the modification of Fig. 2 the vibrations are employed to reciprocate a piston that pumps fluid to move a piston directly to upon the spill gate. In the modification of Fig. 1 the vibrations reciprocate a piston that pumps fluid to operate a servo system that moves a piston opening the spill gate.

The intention is to limit the invention only within the scope of the appended claims.

I claim:

1. In combination, a supercharger having a delivery line, a spill valve in the delivery line, means responsive to fluctuations in the pressure of the gas passing through the supercharger due to arrival or approach of the pumping limit, and means for associating the aforesaid means and the spill valve for causing the said fluctuations to increase the opening of the spill valve.

2. In combination, a supercharger having a delivery line, a spill valve in the delivery line, fluid-pressure means connected with the spill valve, and pumping means responsive to fluctuations in the pressure of the gas passing through the supercharger due to approach or arrival of the pumping limit for actuating the fluid-pressure means to increase the opening of the spill valve.

3. In combination, a supercharger having a delivery line, a spill valve in the delivery line, means forming a space for fluid under pressure, a piston at one region of the space connected with the spill valve, pumping means at another region of the space, means responsive to fluctuations in gas pressure in the delivery line due to approach or arrival of the pumping limit for actuating the pumping means to shift the piston for thereby increasing the opening of the spill valve.

4. In combination, a supercharger having a delivery line, a spill valve in the delivery line, means forming a space for fluid, fluid in the space, pressure-responsive means at one region of the space for actuating the spill valve, and means at another region of the space responsive to fluctuations in gas pressure in the delivery line of the supercharger due to approach or arrival of the pumping limit for exerting pressure on the fluid to cause the pressure-responsive means to increase the opening of the spill valve.

5. In combination, a supercharger having a delivery line, a spill valve in the delivery line, a piston shiftable in response to increase in fluid pressure in the space to increase the opening of the spill valve, pumping means for increasing the fluid pressure, means responsive to fluctuations in gas pressure in the delivery line of the supercharger, and means associating the last mentioned means with the pumping means for causing the said fluctuations in gas pressure to actuate the pumping means.

6. In combination, a supercharger having a delivery line, a spill valve in the delivery line, means forming a space for fluid under pressure, a first piston at one region of the space shiftable in response to increase in fluid pressure to increase the opening of the spill valve, a second piston at another region of the space, means for reciprocating the second piston in response to fluctuations in gas pressure in the delivery line of the supercharger due to approach or arrival of pumping limit, valve means intermediate the pistons for causing reciprocation of the second piston to increase the fluid pressure on the first piston, and a by-pass around the valve for effecting a reduction in the fluid pressure exerted against the first piston upon cessation of the reciprocation of the second piston.

7. In combination, a supercharger having a delivery line, a spill valve in the delivery line, means forming a space for fluid under pressure, pressure-responsive means at one region of the space for actuating the spill valve, a source of fluid under pressure, a drain, a valve normally opening the space to drain, means for closing the last mentioned valve to increase the opening of the spill valve, and means responsive to fluctuations in gas pressure in the delivery line of the supercharger due to approach or arrival of the pumping limit for actuating the valve-closing means.

8. In combination, a supercharger having a delivery line, a spill valve in the delivery line, means forming a space for fluid under pressure, a piston reciprocable in the space to and from a position for increased opening of the spill valve, means normally urging the piston away from the said position, a drain line connected to the space for relieving the pressure in the space, a valve shiftable from a first position connecting the drain line to the space and disconnecting the pressure line from the space to a second position connecting the pressure line to the space and disconnecting the drain line from the space, means normally resiliently urging the valve to the first position, reciprocal means for shifting the valve to the second position, and means for causing fluctuations in gas pressure in the delivery line due to approach or arrival of the pumping limit to actuate the reciprocal means.

THOMAS M. BALL.

REFERENCES CITED

The following references are of record in the file of this patent:

UNITED STATES PATENTS

| Number | Name | Date |
| --- | --- | --- |
| 1,210,030 | Baumann | Dec. 26, 1916 |
| 1,280,812 | Moss | Oct. 8, 1918 |
| 1,281,216 | Schellens | Oct. 8, 1918 |
| 1,833,064 | Baumann | Nov. 24, 1931 |
| 2,000,721 | Standerwick | May 7, 1935 |